United States Patent [19]

Mitomi et al.

[11] Patent Number: 4,803,640
[45] Date of Patent: Feb. 7, 1989

[54] CONTROL ARRANGEMENT FOR AN INDUSTRIAL ROBOT

[75] Inventors: Takashi Mitomi, Higashiosaka; Hitoshi Kubota, Moriguchi, both of Japan

[73] Assignee: Matsushita Electric Industrial Co., Ltd., Kadoma, Japan

[21] Appl. No.: 48,631

[22] Filed: May 11, 1987

[30] Foreign Application Priority Data

May 12, 1986 [JP] Japan .................................. 61-107902

[51] Int. Cl.⁴ ..................... G06F 15/46; G05B 19/42
[52] U.S. Cl. ...................................... 364/513; 318/568;
318/573; 364/193; 364/167.01; 901/3; 901/20
[58] Field of Search .................... 364/513, 167–171,
364/191–193; 318/568, 573; 414/730; 901/2,
3–6, 9, 20

[56] References Cited

U.S. PATENT DOCUMENTS

| | | | |
|---|---|---|---|
| 3,909,600 | 9/1975 | Hohn | 364/193 X |
| 4,105,937 | 8/1978 | Tuda et al. | 364/193 X |
| 4,424,472 | 1/1984 | Jacot-Descombes et al. | 364/513 X |
| 4,541,062 | 9/1985 | Kada et al. | 364/193 X |

Primary Examiner—Joseph Ruggiero
Attorney, Agent, or Firm—Wenderoth, Lind & Ponack

[57] ABSTRACT

The disclosure is directed to a control arrangement for an industrial robot, which is capable of teaching a continuous path operation, and playing back the operation thereby. According to the present invention, it is so arranged that, in a process for automatically memorizing the operating path information of the industrial robot by direct teaching, data for the operating distance on the taught path is also computed so as to be stored together with positional data, and during play back of the function, interpolation is effected based on the operating distance data, whereby the robot is caused to function at a predetermined speed, according to the path at the teaching, and thus, it becomes possible to effect the playing back operation without being influenced by the operating speed during the teaching.

10 Claims, 9 Drawing Sheets

$$P = \sqrt{(Xm-Xr)^2+(Ym-Yr)^2+(Zm-Zr)^2}$$

$(Xm,Ym,Zm)$: SPACE COORDINATE VALUE OF POS. MEMO. IMMED. BEFORE $(Xr,Yr,Zr)$: SPACE COORDINATE VALUE OF LATEST DET. POS.

Fig. 6

| | DURING TEACHING ELAPS.TM. | OPER. DIST. | X | Y | Z | $\Theta$ |
|---|---|---|---|---|---|---|
| START POS. | $t_0 = 0$ | $l_0 = 0$ | $X_0$ | $Y_0$ | $Z_0$ | $\Theta_0$ |
| | $t_1$ | $l_1$ | $X_1$ | $Y_1$ | $Z_1$ | $\Theta_1$ |
| | ⋮ | ⋮ | ⋮ | ⋮ | ⋮ | ⋮ |
| COMPL. POS. | $t_n$ | $l_n$ | $X_n$ | $Y_n$ | $Z_n$ | $\Theta_n$ |

CONTROL ARRANGEMENT FOR AN INDUSTRIAL ROBOT

BACKGROUND OF THE INVENTION

The present invention generally relates to an manipulator apparatus and more particularly, to a control arrangement for an industrial robot capable of teaching a continuous path operation, and also playing back such operation thereby.

For teaching and playing back the continuous path operation as referred to above in an industrial robot, there has conventionally been employed a practice in which an operator directly holds the forward end of the robot for movement thereof so as to cause the robot to draw its operating loci, during which period, rotational angles of respective driving shafts of said robot per each predetermined period of time are detected for storing, whereby during play back, the rotational angles of the respective driving shafts of the robot as memorized are taken out per each predetermined period of time for operation target positions to be given to the robot as operation instructing values therefor, thereby to cause the robot to function as desired.

In the known practice as described above, however, there has been such a problem that, during play back, the industrial robot functions only at a speed in a constant multiple of the speed at the path teaching when said robot was directly moved by the operator for the teaching. In other word, variation in the operating speed by the operator during the teaching also appears in the operation for the play back as variation in the speed. Accordingly, during teaching, the operator must perform the teaching by taking the operating speed also into consideration, besides accurateLy tracing the desired path. By way of example, it is very difficult to teach an operation required to maintain a constant operating speed over a curve as in a sealing agent applying work for uniformly applying a sealing agent on a predetermined path.

SUMMARY OF THE INVENTION

Accordingly, a primary object of the present invention is to provide a control arrangement for an industrial robot, which is so arranged that the operating speed of the robot during play back is not affected by the operating speed during teaching by causing the robot to function at a constant speed during the play back.

A secondary object of the present invention is to provide a control arrangement for an industrial robot of the above described type, which is capable of selecting the operation of the robot during play back, as to whether the robot is operated at the same speed as in the path teaching or at a designated constant speed.

The primary object of the present invention may be achieved by providing a path operating distance memory means which calculates and stores operating distances on the path from a continuous path starting position to be taught, up to a memorized position in correspondence to respective positional data memorized through detection and sampling, and an operation target position signal generating means which interpolates orthogonal coordinate values at respective positions as memorized, with the operating distances on the path being set as parameters.

More specifically, in accomplishing the primary object, according to the present invention, there is provided a control arrangement for an industrial robot, which includes a continuous position memory means which detects and stores operating positions of the industrial robot moved per each predetermined period of time, after detecting and storing an operation starting position of the industrial robot, a start/completion signal generating means which generates an operation starting signal and an operation completion signal of said continuous position memory means based on instructions by an operator, a path operating distance memory means which obtains for storing, the operating distances of the industrial robot on the taught path from said operation starting position to the respective operating positions as stored in said continuous position memory means, an operation target position signal generating means which generates an operation target position signal through calculation of the operation target position of the industrial robot per each predetermined period of time, according to the operating speed as designated, by interpolating respective rotational and orthogonal components of the operating positions on the path memorized during the teaching by the operating distance from the starting position, and means for driving the industrial robot according to said operation target position signal thus generated.

Meanwhile, the secondary object of the present invention may be achieved by providing a path operating distance memory means which calculates and stores operating distances on the path from a continuous path starting position to be taught, up to a memorized position in correspondence to respective positional data memorized through detection and sampling, a play back selecting means for selecting either to play back in the same speed as in the path teaching or to effect operation play back at a designated constant speed, and an operation target position signal generating means which interpolates orthogonal coordinate values at respective positions as memorized with operating distances on the path being set as parameters in the case where the operation play back at the constant speed is selected by the play back selecting means.

More specifically, in order to accomplish the secondary object, according to the present invention, there is provided a control arrangement for an industrial robot, which includes a continuous position memory means which detects and stores operating positions of the industrial robot moved per each predetermined period of time, after detecting and storing an operation starting position of the industrial robot, a start/completion signal generating means which generates an operation starting signal and an operation completion signal of said continuous position memory means based on instructions by an operator, a path operating distance memory means which obtains for storing, the operating distances of the industrial robot on the taught path from said operation starting position to the respective operating positions as stored in said continuous position memory means, a play back selecting means for selecting either to play back in the same speed as in the path teaching or to effect operation play back at a designated constant speed through operation by an operator, an operation target position signal generating means which generates an operation target position signal through calculation of the operation target position of the industrial robot per each predetermined period of time, according to the operating speed as designated, by interpolating respective rotational and orthogonal components of the operating positions on the path memorized during the teaching by the operating distance from the starting position, in the case where operation play back at the constant speed is selected by said play back selecting means and means for driving the industrial robot according to said operation target position signal thus generated.

By the arrangement according to the present invention as described above, it becomes possible to cause the industrial robot to function at an arbitrary constant speed according to the instruction by the operator, with respect to a continuous curve taught by a simple procedure without taking much time.

More specifically, in a process for automatically memorizing the operating path information of the robot through direct teaching, the data for operating distance on the taught path is also computed so as to be memorized together with the positional data, and thus, during the operation play back, through interpolation by the above operating distance, it is possible to effect the constant speed play back by the processing time almost equal to that in the play back at the same speed during the path teaching.

Furthermore, by the play back selecting means, selection may be effected between the play back at the same speed as in the path teaching and the the designated constant speed.

BRIEF DESCRIPTION OF THE DRAWINGS

These and other objects and features of the present invention will become apparent from the following description taken in conjunction with the preferred embodiment thereof with reference to the accompanying drawings, in which:

FIG. 6 is a diagram for explaining construction of data with respect to the embodiment of FIG. 2.

DETAILED DESCRIPTION OF THE INVENTION

Figure 1:
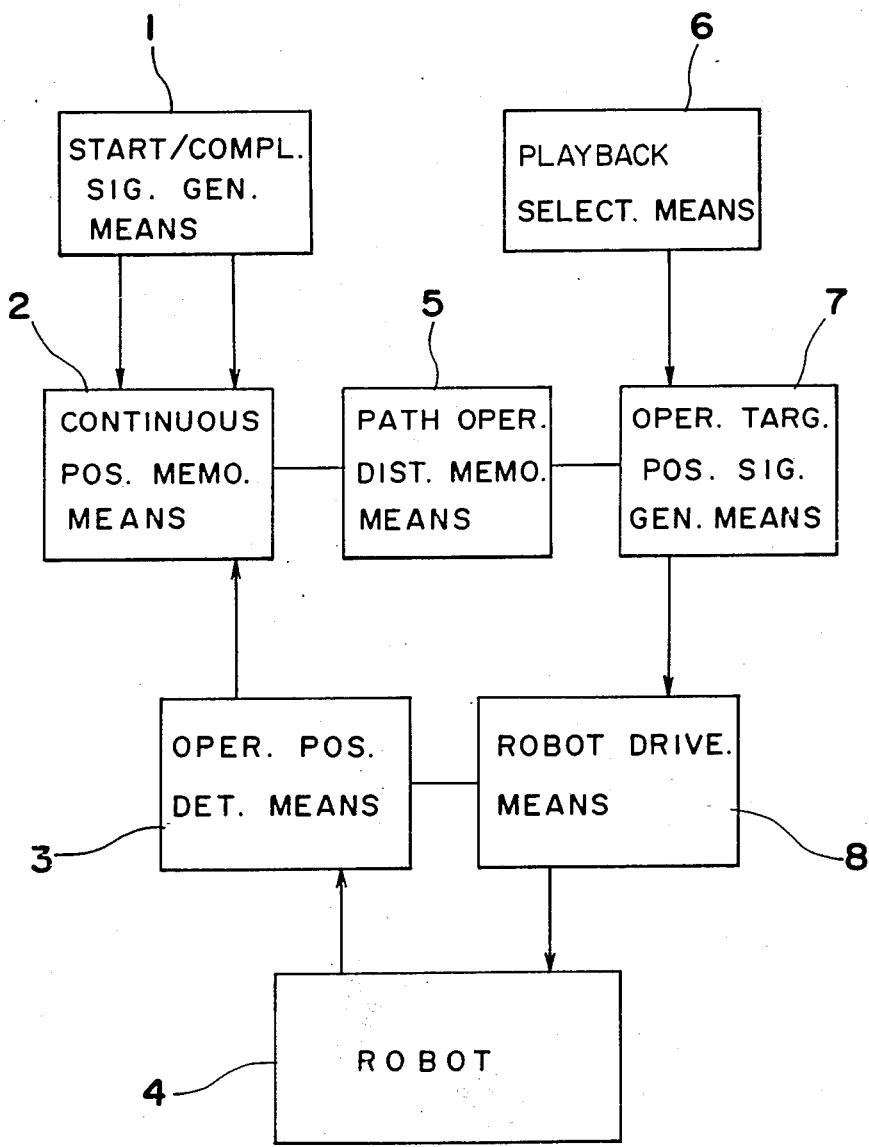
FIG. 1 is a diagram for explaining general construction of a control arrangement for an industrial robot according to the present invention.

Before the description of the present invention proceeds, it is to be noted that like parts are designated by like reference numerals throughout the accompanying drawings.

Referring now to the drawings, there is shown in FIG. 1, a diagram representing the mutual relation among essential constitutional items in a control arrangement according to the present invention.

It is to be noted that, in the present invention, in order to memorize positions necessary for maintaining accuracy for the desired path, but as small as possible in number, it is determined whether or not the position as detected during the teaching should be memorized, through employment of means for automatically judging the operating distance from the position memorized immediately before, and also, the linearity of the operating path.

In FIG. 1, at the time of teaching, during the period from emission of a starting signal to be generated from a start/completion signal generating means 1 through operation by an operator, to emission of a completion signal thereby, a continuous position memory means 2 automatically memorizes in the number as desired, the positions of the robot 4 to be detected by an operating position detecting means 3 per each predetermined period of time. In the continuous position memory means 2, in order to store the path to be taught, by a properly small storing amount according to a required accuracy, the operating distance from the position memorized immediately before, and the operating linearity from the position memorized immediately before, are judged so as to determine whether or not the newly detected position of the robot 4 should be memorized. Moreover, a path operating distance memory means 5 calculates and stores the operating distances from the starting position with respect to the respective positions on the path.

During play back, if the play back at the operating speed designation is selected by a play back selecting means 6, the playing back period operating time and operating distance from the path starting position are caused to correspond to each other according to the given speed, by an operation target position signal generating means 7 and the operating position on the path as memorized is interpolated, with the operating distances on the path being set as parameters, thereby to find the operation target position at the predetermined time. For example, for operation at a constant magnitude of the speed, the interpolation circulation is effected so as to increase the operating distance on the path by a predetermined amount for obtaining the operation target position per each predetermined period of time on the path. Thus, the robot 4 is subjected to operation on the path by a robot driving means 8 according to the operation target position obtained as described above.

Figure 2:
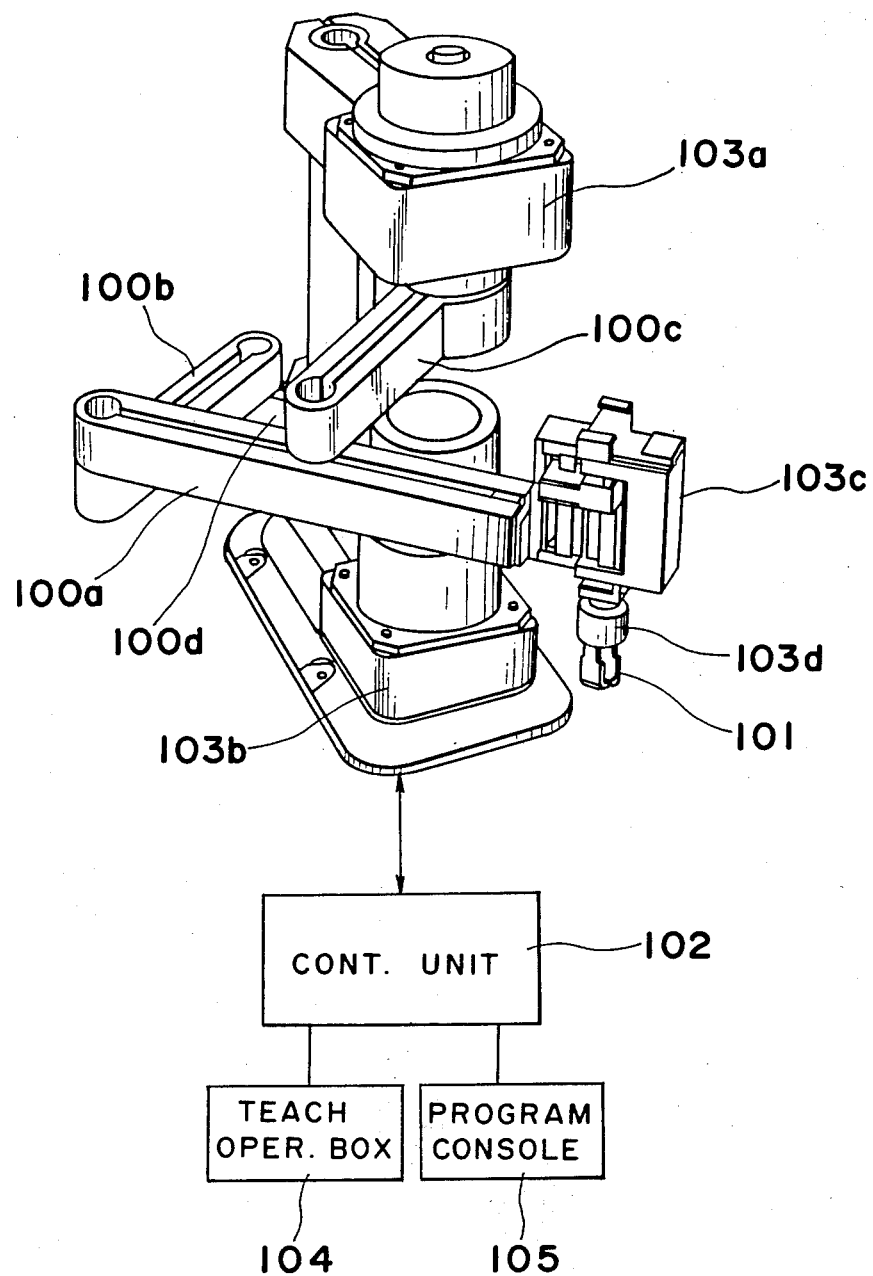
FIG. 2 is a perspective view of an industrial robot to which the control arrangement according to one preferred embodiment of the present invention may be applied.
Figure 3:
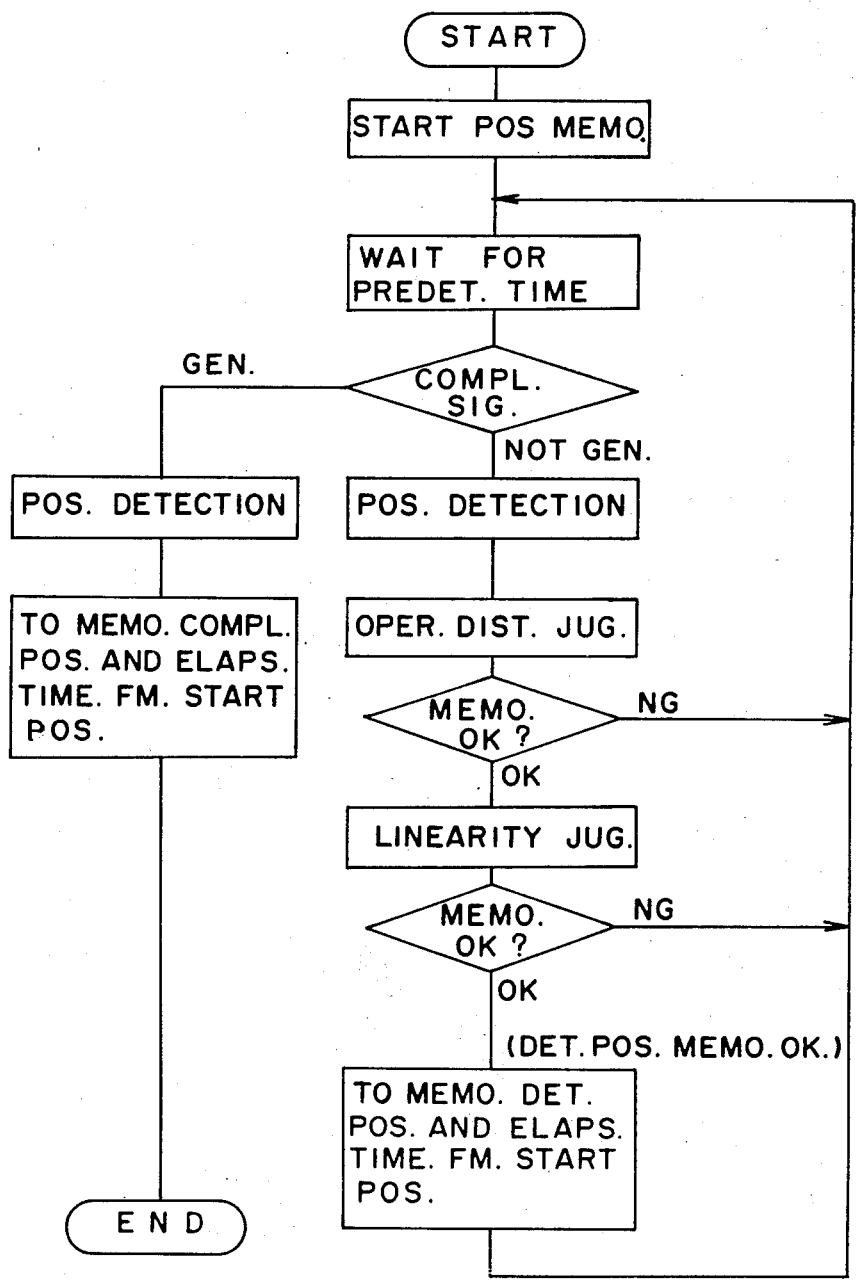
FIGS. 3, 4 and 5 are flow-charts for explaining processings during teaching with respect to the embodiment of FIG. 2.

Referring also to FIG. 2, there is shown a robot R to be employed for the embodiment according to the present invention. This robot R is a kind of industrial robot called a horizontal multi-joint or articulated robot, and has four shafts (not particularly shown) to be driven by motors 103a, 103b, 103c and 103d to provide movements in four kinds of freedom. More specifically, the robot R generally includes a supply column C mounted on a base B, a link mechanism L having link arms 100a, 100b, 100c and 100d pivotally connected to each other and movably coupled to the support column C through the motors 103a and 103b, and an operating hand 101 pivotally connected to the forward end of the link arm 100 through the linear motor 103c for vertical movement, and also through the motor 103d for rotational movement. The operation of the operating hand 101 in the horizontal direction is allowed by the motors 103a and 103b via the link mechanism L, while the vertical movement of the operating hand 101 is effected by the linear motor 103c provided at the forward end of the link mechanism L, and the rotation thereof is made possible by the motor 103d provided at the base portion of said operating hand. In other words, within the operating range, the positions of the operating hand 101 at the distal end of the robot R may be set at any point in a three dimensional space, and also at any rotation angles thereof as desired. The positions in the present embodiment also include the attitude or posture of the operating hand 101, and may be determined by four values, i.e., point coordinate values X, Y and Z of the three dimensional orthogonal coordinate system for the operating hand, and a value θ for the orientation of said operating hand.

For the positional detection of the robot R, articular angles are detected by encoders (not shown) mounted on the respective driving motors 103a and 103b, and the values for the operating hand position (X, Y, Z, θ) are obtained through calculation by taking arm lengths, etc. into consideration.

The robot R is coupled to a control unit 102 incorporated therein with a micro-computer and a memory (not shown) for functioning based on a program, while an operating box 104 for teaching and a program console 105 are further connected to said control unit 102. The operating box 104 for teaching is operated by an operator during the teaching so as to generate signals for giving instructions to the control unit 102. Meanwhile, the program console 105 has a display and a keyboard (not shown), and is used for editing program data related to the work and operation of the robot, and also for setting various parameters necessary for instructions to cause the robot to function. It is to be noted that the control of operation of the robot is effected in such a manner that the micro-computer in the control unit 102 calculates the corresponding articular angles and motor driving amount based on the operating target position (X, Y, Z, θ) so as to control the motors according to the result of the calculation.

Referring further to the flow-charts of FIGS. 3 through 9, the teaching and play back of the continuous path operation will be described hereinafter.

Figure 4:
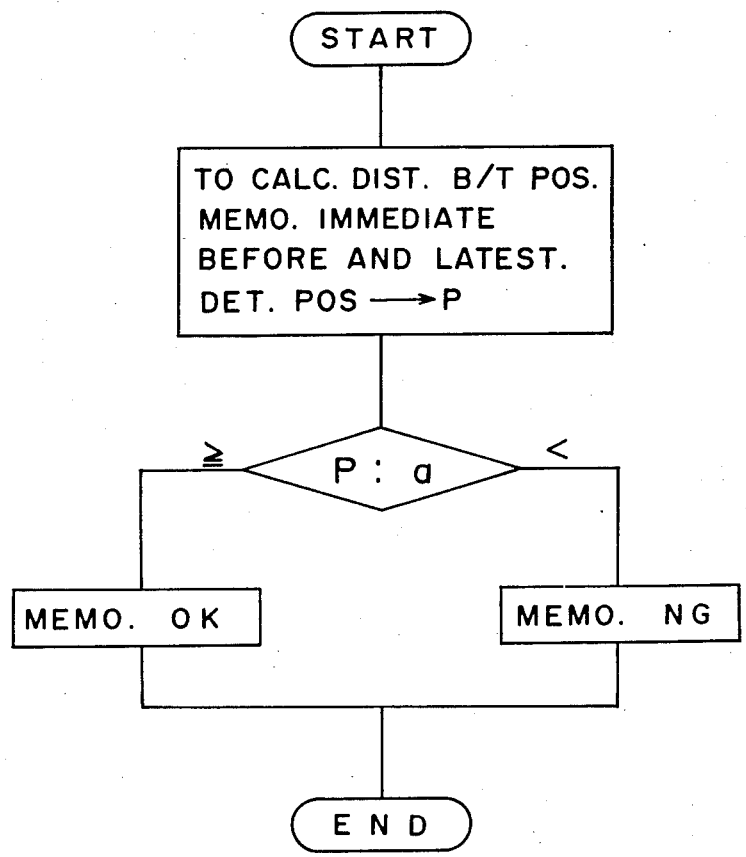

In the teaching for the continuous path operation, the operator pushes one button (not shown) of the teaching operating box 104 (FIG. 2) to generate the operation starting signal of the continuous position memory means 2 shown in FIG. 1, and moves the forward end of the robot along a desired path, and then, by pushing the one button of the teaching operating box 104, produces the operation completion signal of the continuous position memory means 2. In the control unit 102, upon generation of the starting signal, the position of the robot at that time point is detected for storing, and by detecting the robot position per each predetermined time until the completion signal is generated thereafter, if the result for the "detected position memory O.K." is obtained at the operating distance judgement and linearity judgement to be described subsequently, the detected position and the elapsed time from the starting signal generation are memorized. The flow-chart for the processing as described above is shown in FIG. 3. Meanwhile, the flow-chart for the processing of the operating distance judgement is shown in FIG. 4, and the flow-chart for the linearity judgement is given in FIG. 5.

The operating distance judgement is intended not to store the detected position, by regarding that the robot has hardly moved if the position of the robot is not spaced from the position memorized immediately therebefore by a predetermined distance. A variable a in the flow-chart of FIG. 4 is a numerical value set by the operator as the value for the predetermined distance as referred to above.

Figure 5:
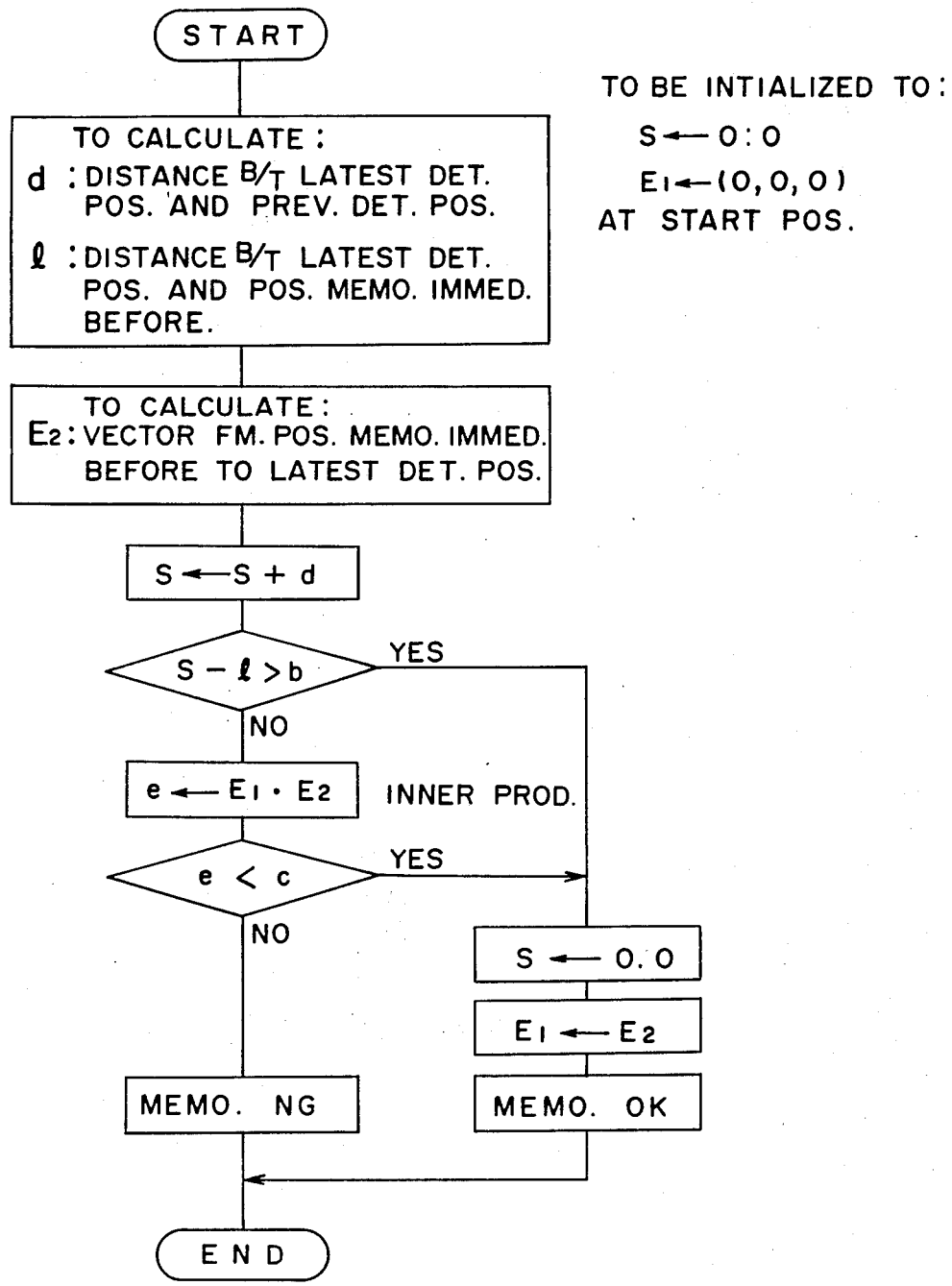

The linearity judgement is intended not to memorize the detected position in the case where the operating path is considered to be more linear than that designated by set numerical values b and c, by effecting two kinds of evaluation as shown in the flow-chart of FIG. 5.

More specifically, if the difference between a total value S of the operating distance from the position memorized immediately befoe to the latest detected position and a straight line distance l is larger than a predetermined value, the latest detected position is memorized, based on a judgement that the degree of curving of the operating path is large in the vicinity of the latest detected position. The variable b in the flow-chart of FIG. 5 is the numerical value to be compared with the difference between the operating distance total value S and the straight line distance l referred to above. Moreover, an angle formed between a directional vector E1 from the position memorized two times before to the position memorized immediately before, and a directional vector E2 from the position memorized immediately before to the latest detected position, is evaluated by calculating an inner product of E1 and E2, and if the inner product is smaller than a predetermined value, it is judged that the degree of curving of the operating path is large so as to memorize the latest detected position. The variable c in the flow-chart of FIG. 5 is the numerical value set by the operator as a constant predetermined value to be compared with the inner product referred to above.

Each of the operating distance judgement and the linearity judgement has for its object to avoid using a memory unit of an extremely large capacity, by arranging not to memorize positional data more than necessary with respect to the path interpolation accuracy during play back, and the set numerical values a, b and c are inputted through the program console 105 and stored in the memory within the control unit 102.

Subsequently, the respective components for the memorized positions are subjected to interpolation by the time from the starting position so as to calculate differential values of distances at the respective points obtained by the interpolation, and by integrating the values based on Simpson's rule, the operating distances on the path from the starting position to the respective memorized positions are obtained to be memorized.

FIG. 6 is a diagram for explaining the structure of data to be memorized. In this example, data in n+1 sets are stored, including the starting position and completing position.

The interpolation of the respective components for the memorized positions by the time should preferably be effected in the same method as in the interpolation during the operation play back, and in the present embodiment, the spline interpolation is employed. Specifically, calculations as follows are to be effected.

In the first place, in order to make it possible to effect the spline interpolation also in the section for the starting and ending of the teaching path, $t_{-1}$, $t_{-2}$, $t_{n+1}$ and $t_{n+2}$, and $X_{-1}$, $X_{-2}$, $X_{n+1}$, $X_{n+2}$, $Y_{-1}$, $Y_{-2}$, $Y_{n+1}$, and $Y_{n+2}$, $Z_{-1}$, $Z_{-2}$, $Z_{n+1}$ and $Z_{n+2}$ respectively corresponding thereto, are virtually obtained by approximation based on the quadratic curve.

$$t_{-1} = t_0 - (t_2 - t_1), \quad t_{n+1} = t_n + (t_{n-1} - t_{n-2})$$

$$t_{-2} = t_{-1} - (t_1 - t_0), \quad t_{n+2} = t_{n+1} + (t_n - t_{n-1})$$

If a function q is represented as $$q(t, t_0, t_1, t_2, x_0, x_1, x_2) = \frac{x_0(t - t_1)(t - t_2)}{(t_0 - t_1)(t_0 - t_2)} +$$

$$\frac{x_1(t-t_2)(t-t_0)}{(t_1-t_2)(t_1-t_0)} + \frac{x_2(t-t_0)(t-t_1)}{(t_2-t_0)(t_2-t_1)}$$

$X_{-1} = q(t_{-1}, t_0, t_1, t_2, x_0, x_1, x_2)$ $X_{-2} = q(t_{-2}, t_0, t_1, t_2, x_0, x_1, x_2)$ $X_{n+1} = q(t_{n+1}, t_n, t_{n-1}, t_{n-2}, x_n, x_{n-1}, x_{n-2})$ $X_{n+2} = q(t_{n+2}, t_n, t_{n-1}, t_{n-2}, x_n, x_{n-1}, x_{n-2})$ $Y_{-1} = q(t_{-1}, t_0, t_1, t_2, Y_0, Y_1, Y_2)$ $Y_{-2} = q(t_{-2}, t_0, t_1, t_2, Y_0, Y_1, Y_2)$ $Y_{n+1} = q(t_{n+1}, t_n, t_{n-1}, t_{n-2}, Y_n, Y_{n-1}, Y_{n-2})$ $Y_{n+2} = q(t_{n+2}, t_n, t_{n-1}, t_{n-2}, Y_n, Y_{n-1}, Y_{n-2})$ $Z_{-1} = q(t_{-1}, t_0, t_1, t_2, Z_0, Z_1, Z_2)$ $Z_{-2} = q(t_{-2}, t_0, t_1, t_2, Z_0, Z_1, Z_2)$ $Z_{n+1} = q(t_{n+1}, t_n, t_{n-1}, t_{n-2}, Z_n, Z_{n-1}, Z_{n-2})$ $Z_{n+2} = q(t_{n+2}, t_n, t_{n-1}, t_{n-2}, Z_n, Z_{n-1}, Z_{n-2})$

With respect to $i = 0 \sim n-1$, the interpolation value of X for t in the relation as $t_i < t < t_{i+1}$ may be calculated by a cubic equation as follows.

$$X_i(t) = a_{0xi} + a_{1xi}(t-t_i) + a_{2xi}(t-t_i)^2 + a_{3xi}(t-t_i)^3$$

where $a_{0xi}$, $a_{1xi}$, $a_{2xi}$ and $a_{3xi}$ are constants to be obtained by the following calculations.

The inclination $m_i$ of the X component in $t_i \sim t_{i+1}$ is calculated by $$m_i = \frac{X_{i+1} - X_i}{t_{i+1} - t_i}$$

$(i = -2 \sim n+1)$ and by using the result, the inclination $\tau_i$ of the X component in $t_i$ is obtained by $$\tau_i = \frac{|m_{i+1} - m_i| m_{i-1} + |m_{i-1} - m_{i-2}| m_i}{|m_{i+1} - m_i| + |m_{i-1} - m_{i-2}|}$$

However, in the case where the relation is $|m_{i+1} - m_i| + |m_{i-1} - m_{i-2}| = 0$, the calculation is effected by $\tau_i = \frac{1}{2}(m_{i-1} + m_i)$
$(i = 0 \sim n)$ to obtain the values for $a_{0xi}$, $a_{1xi}$, $a_{2xi}$ and $a_{3xi}$.

$a_{0xi} = x_i$
$a_{1xi} = \tau_i$ $$a_{2xi} = \frac{3(X_{i+1} - X_i) - (\tau_{i+1} - 2\tau_i)(t_{i+1} - t_i)}{(t_{i+1} - t_i)^2}$$

$$a_{3xi} = \frac{(\tau_{i+1} + \tau_i)(t_{i+1} - t_i) - 2(X_{i+1} - X_i)}{(t_{i+1} - t_i)^3}$$

With respect to $i = 0 \sim n-1$, the interpolation values of Y and Z for t in the relation $t_i < t < t_{i+1}$ may be calculated in the similar manner by replacing X in the above calculation by Y and Z respectively.

When the interpolation values of X, Y and Z for t in the relation $t_i < t < t_{i+1}$ as obtained in the manner as described above are represented by $X_i(t)$, $Y_i(t)$ and $Z_i(t)$, the operating distance $l_i$ ($i = 1 \sim n$) may be calculated by obtaining the differentiated value $f_i(t)$ of the distance through employment of calculating equations in which $X_i(t)$, $Y_i(t)$ and $Z_i(t)$ are differentiated, and effecting the numerical value integration based on Simpson's rule as follows.

$$\frac{dX_i(t)}{dt} = a_{1Xi} + 2a_{2Xi}(t-t_i) + 3a_{3Xi}(t-t_i)^2$$

$$\frac{dY_i(t)}{dt} = a_{1Yi} + 2a_{2Yi}(t-t_i) + 3a_{3Yi}(t-t_i)^2$$

$$\frac{dZ_i(t)}{dt} = a_{1Zi} + 2a_{2Zi}(t-t_i) + 3a_{3Zi}(t-t_i)^2$$

$$f_i(t) = \sqrt{\left(\frac{dX_i(t)}{dt}\right)^2 + \left(\frac{dY_i(t)}{dt}\right)^2 + \left(\frac{dZ_i(t)}{dt}\right)^2}$$

On the assumption that m represents the number of division of the numerical integration in the section for $t_{i-1} \sim t_i$, the distance $l_i$ will be represented by $$l_i = l_{i-1} + \frac{h}{3}\left( f_{i-1}(t_{i-1}) = 4\sum_{j=1}^{\frac{1}{2}m} f_{i-1}(t_{i-1} + (2j-1)h) + \right.$$

$$\left. 2\sum_{j=1}^{\frac{1}{2}m-1} f_{i-1}(a + 2jh) + f_{i-1}(t_i) \right)$$

where $h + \frac{t_i - t_{i-1}}{m}$

The value $l_i$ thus obtained is memorized together with the positional data $X_i$, $Y_i$ and $Z_i$, and the time $t_i$.

In the play back of the continuous path operation, when the robot is caused to function by setting the positions obtained by interpolating the components for the respective positions memorized with the elapsed time from the memorized starting position being set as parameters, as the operation target positions at the respective time during the play back, the operation is played back at a speed in a constant multiple of the operating speed during the teaching, and in the case where the operation play back at a constant speed is selected through designation by the program as inputted by the program console, if the robot is caused to function by setting, as the operation target position at each time during the play back, the positions as obtained through the spline interpolation of the components of the respective positions stored, with the operating distances from the memorized starting position being set as parameters, the robot is operated on the taught path at a speed of a constant magnitude as designated completely irrelevantly to the operating speed during the teaching.

Figure 7:
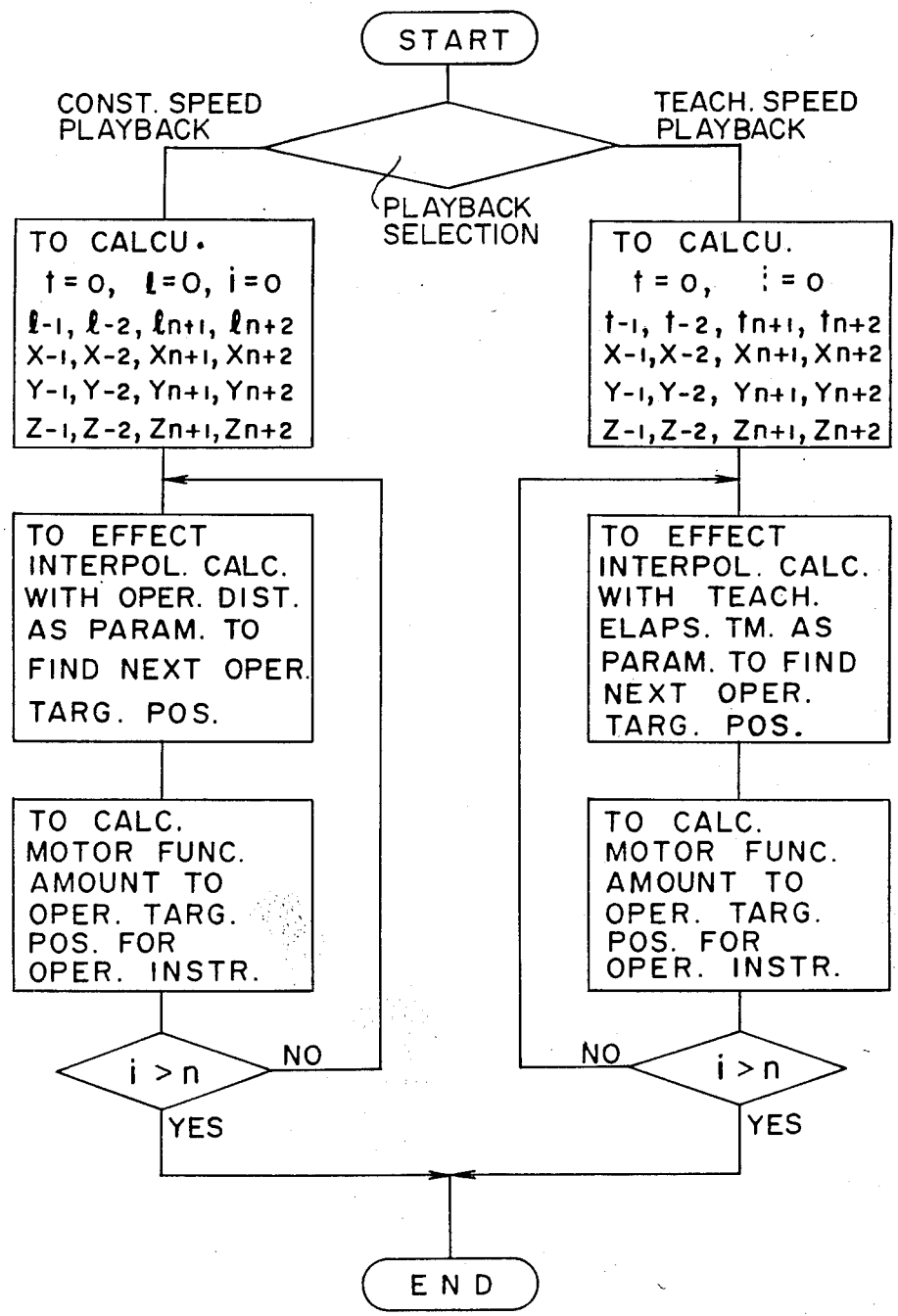
FIGS. 7, 8 and 9 are flow-charts for explaining processings during play back with respect to the embodiment of FIG. 2.

FIG. 7 shows a flow-chart for the processing during the play back. In the first place, by checking the flag in the memory to be set by the play back selecting means, selection is made as to whether the play back is effected at the same speed as in the path teaching period or at a constant speed as designated.

In the case where the play back is effected at the same speed as that during the path teaching, firstly, values for $t_{-1}, t_{-2}, t_{n+1}, t_{n+2}, X_{-1}, X_{-2}, X_{n+1}, X_{n+2}, Y_{-1}, Y_{-2}, Y_{n+1}, Y_{n+2}, Z_{-1}, Z_{-2}, Z_{n+1}$ and $Z_{n+2}$ are virtually obtained so that the spline interpolation, with the time set as parameters can be performed also at the starting and ending of the taught path. Then, the operation target position for each unit time $\Delta t$ of the motor control cycle is obtained by an interpolation calculation with the time t set as the parameter.

Figure 8:
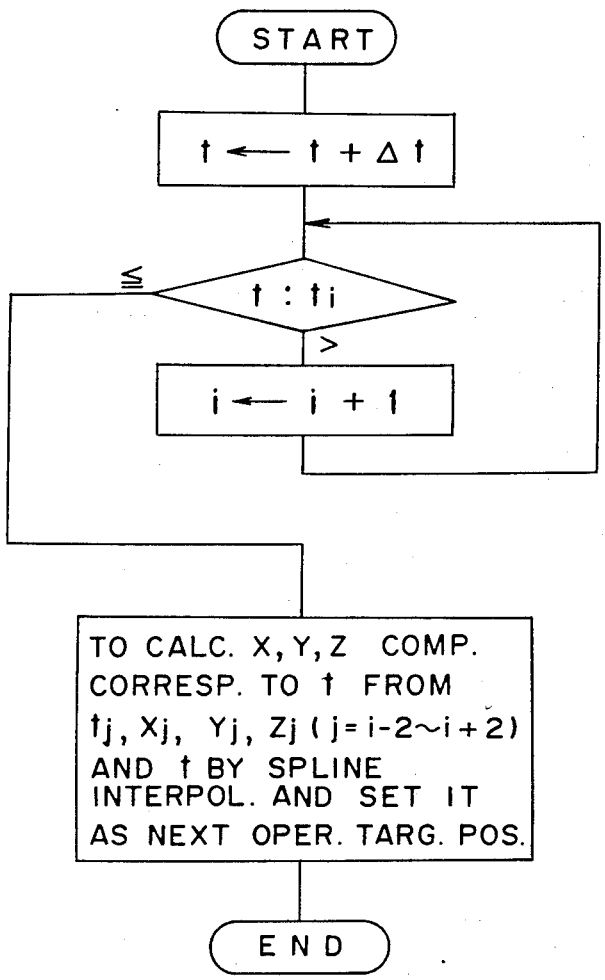

FIG. 8 shows a flow-chart of the processing for obtaining the subsequent operation target position.

Through addition to the time t by $\Delta t$, the value i for establishing the relation $t_i \leq t < t_{i+1}$ is obtained, and a spline interpolation is effected through employment of $t_j, X_j, Y_j$, and $Z_j$ (j=i−2∼i+2). The calculation for obtaining $t_{-1}, t_{-2}, t_{n+1}, t_{n+2}, X_{-1}, X_{-2}, X_{n+1}, X_{n+2}, Y_{-1}, Y_{-2}, Y_{n+1}, Y_{n+2}, Z_{-1}, Z_{-2}, Z_{n+1}$ and $Z_{n+2}$ and that for the spline interpolation are similar to those as effected for obtaining the operating distances as described earlier. The interpolation values for X, Y and Z as obtained by the above calculation are rendered to be the X, Y and Z components of the subsequent operation target positions. However, in the case where the relation becomes $t_n \leq t$, i.e., i>n, the last data $X_n, Y_n$ and $Z_n$ of the taught path are rendered to be X, Y and Z components for the subsequent operation target positions. With respect to the attitude component $\theta$ of the operating hand, the subsequent operation target value is calculated by separately effecting a bisecting interpolation according to t.

By repeatedly effecting, up to the last point of the taught path, the motor control to cause the robot to function according to the subsequent operation target position thus obtained, the operation play back may be effected at the same speed as that during the path teaching.

On the other hand, in the case where the operation play back is to be effected by a designated constant speed, in the first place, values for $l_{-1}, l_{-2}, l_{n+1}, l_{n+2}, X_{-1}, X_{-2}, X_{n+1}, X_{n+2}, Y_{-1}, Y_{-2}, Y_{n+1}, Y_{n+2}, Z_{-1}, Z_{-2}, Z_{n+1}$ and $Z_{n+2}$ are virtually obtained by calculations as follows.

$$l_{-1}=l_0-(l_2-l_1), \quad l_{n+1}=l_n+(l_{n-1}-l_{n-2})$$

$$l_{-2}=l_{-1}-(l_1-l_0), \quad l_{n+2}=l_{n+1}+(l_n-l_{n-1})$$

$$X_{-1}=q(l_{-1}, l_0, l_1, l_2, x_0, x_1, x_2)$$

$$X_{-2}=q(l_{-2}, l_0, l_1, l_2, x_0, x_1, x_2)$$

$$X_{n+1}=q(l_{n+1}, l_n, l_{n-1}, l_{n-2}, x_n, x_{n-1}, x_{n-2})$$

$$X_{n+2}=q(l_{n+1}, l_n, l_{n-1}, l_{n-2}, x_n, x_{n-1}, x_{n-2})$$

$$Y_{-1}=q(l_{-1}, l_0, l_1, l_2, Y_0, Y_1, Y_2)$$

$$Y_{-2}=q(l_{-2}, l_0, l_1, l_2, Y_0, Y_1, Y_2)$$

$$Y_{n+1}=q(l_{n+1}, l_n, l_{n-1}, l_{n-2}, Y_n, Y_{n-1}, Y_{n-2})$$

$$Y_{n+2}=q(l_{n+2}, l_n, l_{n-1}, l_{n-2}, Y_n, Y_{n-1}, Y_{n-2})$$

$$Z_{-1}=q(l_{-1}, l_0, l_1, l_2, Z_0, Z_1, Z_2)$$

$$Z_{-2}=q(l_{-2}, l_0, l_1, l_2, Z_0, Z_1, Z_2)$$

$$Z_{n+1}=q(l_{n+1}, l_n, l_{n-1}, l_{n=2}, Z_n, Z_{n-1}, Z_{n-2})$$

$$Z_{n+2}=q(l_{n+2}, l_n, l_{n-1}, l_{n-2}, Z_n, Z_{n-1}, Z_{n-2})$$

Then, the operation target position for each unit time $\Delta t$ of the motor control cycle is to be obtained by an interpolation calculation, with the operating distance l set as the parameter.

Figure 9:
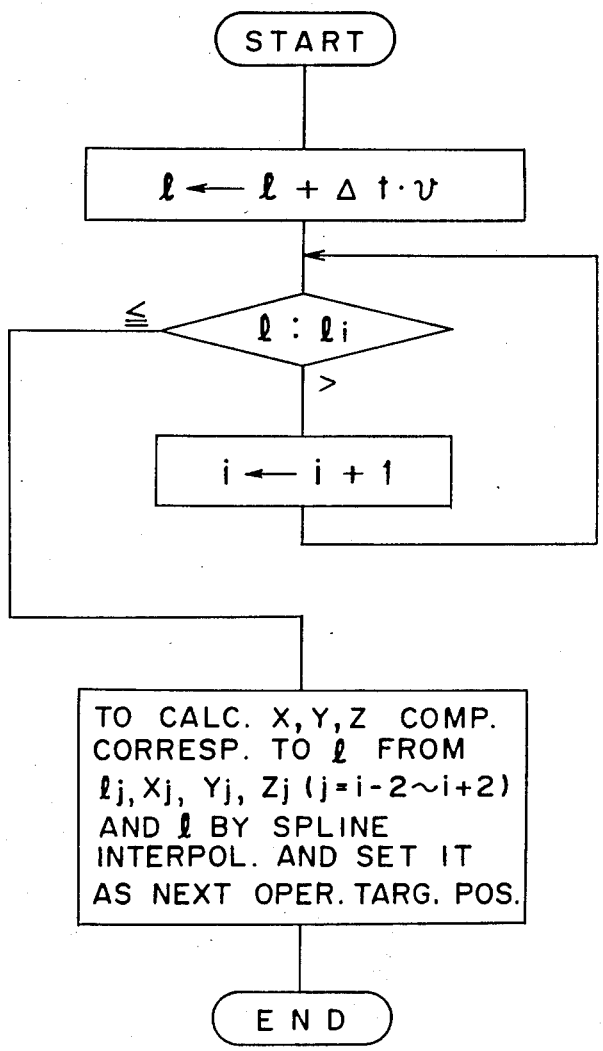

FIG. 9 shows a flow-chart of the processing for obtaining the subsequent operation target position.

By adding to l, an amount $V \cdot \Delta t$ for operation at a speed V for the time $\Delta t$ so as to obtain i to establish the relation $l_i \leq l < l_{i+1}$, and a spline interpolation is effected through employment of $l_j, X_j, Y_j, Z_j$ (j=i−2∼i+2).

The interpolation value of X with respect to l of $l_i \leq l < l_{i+1}$ is obtained by the following cubic equation.

$$X_i(l)=b_{0 \times i}+b_{1 \times i}(l-l_i)+b_{2 \times i}(l-l_i)^2+b_{3 \times i}(l-l_i)^3$$

where $b_{0 \times i}, b_{1 \times i}, b_{2 \times i}$ and $b_{3 \times i}$ are constants to be obtained by the following calculations.

The inclination $m_j$ (j=i−2∼i+2) of the X component in $l_j \sim l_{j+1}$ is calculated by an equation $$m'_j = \frac{X_{j+1} - X_j}{l_{j+1} - l_j}$$

and through employment of the result, the inclination $\tau'_k$ (k=i, i+1) of the X component in $l_k$ is calculated by $$\tau'_k = \frac{|m'_{k+1} - m'_k| m'_{k-1} + |m'_{k-1} - m'_{k-2}| m'_k}{|m'_{k+1} - m'_k| + |m'_{k-1} - m'_{k-2}|}$$

However, in the case where $|m'_{k+1}-m'_k|+|m'_{k-1}-m'_{k=2}|=0$, the calculation is effected by $$\tau'_k = \tfrac{1}{2}(m'_{k-1}+m'_k)$$

to obtain $b_{0xi}, b_{1xi}, b_{2xi}$ and $b_{3xi}$.
$b_{0xi} + x_i$
$b_{1xi} = \tau'_i$ $$b_{2xi} = \frac{3(X_{i+1} - X_i) - (\tau'_{i+1} - 2\tau'_i)(l_{i+1} - l_i)}{(l_{i+1} - l_i)^2}$$

$$b_{3xi} = \frac{(\tau_{i+1} + \tau_i)(l_{i+1} - l_i) - 2(X_{i+1} - X_i)}{(l_{i+1} - l_i)^3}$$

Interpolation values of Y and X with respect to l of $l_i < l < l_{i+1}$ are also calculated in the similar manner through replacement of x in the above calculation by Y and Z respectively. The interpolation values of X, Y and Z thus obtained are used as X, Y and Z components of the subsequent operation target positions. However, in the case where the relation becomes $l_n \leq l$, i.e., i>n, the last point data $X_n, Y_n$ and $Z_n$ of the taught path are rendered to be X, Y and Z components for the subsequent operation target positions. With respect to the attitude component $\theta$ of the operating hand, the subsequent operation target value is calculated by separately effecting a bisecting interpolation according to l.

By repeatedly effecting, up to the last point of the taught path, the motor control to cause the robot to function according to the subsequent operation target position thus obtained, the operation play back may be effected at designated constant speed V.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A control arrangement for an industrial robot, which comprises a continuous position memory means which detects and stores operating positions of the industrial robot moved per each predetermined period of time, after detecting and storing an operation starting position of the industrial robot, a start/completion signal generating means which generates an operation starting signal and an operation completion signal of said continuous position memory means based on instructions by an operator, a path operating distance memory means which obtains for storing, the operating distances of the industrial robot on the taught path from said operation starting position to the respective operating positions as stored in said continuous position memory means, an operation target position signal generating means which generates an operation target position signal through calculation of the operation target position of the industrial robot per each predetermined period of time, according to the operating speed as designated, by interpolating respective rotational and orthogonal components of the operating positions on the path memorized during the teaching by the operating distance from the starting position, and means for driving the industrial robot according to said operation target position signal thus generated.

2. A control arrangement as claimed in claim 1, wherein the interpolation by the operation target position signal generating means is of spline interpolation.

3. A control arrangement as claimed in claim 1, wherein said continuous position memory means is so arranged that it does not store the detected position unless the distance between the operating position detected per each predetermined period of time and the position memorized immediately therebefore exceeds a predetermined threshold value, and when storing, simultaneously stores elapsed time from the starting position, thereby to memorize the operating position of the industrial robot at that time point and elapsed time from the operation starting position according to the completion signal generated by said starting/completion signal generating means.

4. A control arrangement as claimed in claim 3, wherein said continuous position memory means is arranged to calculate a parameter representing a curvature of the operating path so as not to store the position detected for each predetermined period of time unless the curvature parameter of the operating path from the operating position memorized immediately therebefore exceeds a predetermined threshold value.

5. A control arrangement as claimed in claim 4, further comprising means for setting, through operation by an operator, the predetermined time interval for detecting the operating position in said continuous position memory means, the predetermined threshold value related to the distance employed for judgement as to whether or not the detected position should be stored, and the predetermined threshold value related to the curvature parameter.

6. A control arrangement for an industrial robot, which comprises a continuous position memory means which detects and stores operating positions of the industrial robot moved per each predetermined period of time, after detecting and storing an operation starting position of the industrial robot, a start/completion signal generating means which generates an operation starting signal and an operation completion signal of said continuous position memory means based on instructions by an operator, a path operating distance memory means which obtains for storing, the operating distances of the industrial robot on the taught path from said operation starting position to the respective operating positions as stored in said continuous position memory means, a play back selecting means for selecting either to play back in the same speed as in the path teaching or to effect operation play back at a designated constant speed through operation by an operator, an operation target position signal generating means which generates an operation target position signal through calculation of the operation target position of the industrial robot per each predetermined period of time, according to the operation speed as designated, by interpolating respective rotational and orthogonal components of the operation positions on the path memorized during the teaching by the operating distance from the starting position, in the case where operation play back at the constant speed is selected by said play back selecting means and means for driving the industrial robot according to said operation target position signal thus generated.

7. A control arrangement as claimed in claim 6, wherein the interpolation by the operation target position signal generating means is of spline interpolation.

8. A control arrangement as claimed in claim 6, wherein said continuous position memory means is so arranged that it does not store the detected position unless the distance between the operating position detected per each predetermined period of time and the position memorized immediately therebefore exceeds a predetermined threshold value, and when storing, simultaneously stores elapsed time from the starting position, thereby to memorize the operating position of the industrial robot at that time point and elapsed time from the operation starting position according to the completion signal generated by said starting/completion signal generating means.

9. A control arrangement as claimed in claim 8, wherein said continuous position memory means is arranged to calculate a parameter representing a curvature of the operating path so as not to store the position detected for each predetermined period of time unless the curvature parameter of the operating path from the operating position memorized immediately therebefore exceeds a predetermined threshold value.

10. A control arrangement as claimed in claim 9, further comprising means for setting, through operation by an operator, the predetermined time interval for detecting the operating position in said continuous position memory means, the predetermined threshold value related to the distance employed for judgement as to whether or not the detected position should be stored, and the predetermined threshold value related to the curvature parameter.

* * * * *